(12) United States Patent
Yanase et al.

(10) Patent No.: US 11,746,037 B2
(45) Date of Patent: Sep. 5, 2023

(54) METHOD FOR MANUFACTURING GLASS FIBER STRAND

(71) Applicant: NIPPON ELECTRIC GLASS CO., LTD., Otsu (JP)

(72) Inventors: Tomoki Yanase, Otsu (JP); Masaru Nanbu, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 812 days.

(21) Appl. No.: 16/619,639

(22) PCT Filed: May 28, 2018

(86) PCT No.: PCT/JP2018/020422
§ 371 (c)(1),
(2) Date: Dec. 5, 2019

(87) PCT Pub. No.: WO2018/225570
PCT Pub. Date: Dec. 13, 2018

(65) Prior Publication Data
US 2020/0140316 A1 May 7, 2020

(30) Foreign Application Priority Data
Jun. 6, 2017 (JP) ................. 2017-111984

(51) Int. Cl.
*C03B 37/028* (2006.01)
*C03B 37/07* (2006.01)
(Continued)

(52) U.S. Cl.
CPC ........ *C03B 37/0216* (2013.01); *C03B 37/028* (2013.01); *C03B 37/07* (2013.01); *G01N 21/8851* (2013.01); *G01N 2021/8887* (2013.01)

(58) Field of Classification Search
CPC .... C03B 37/0216; C03B 37/028; C03B 37/07
See application file for complete search history.

(56) References Cited

U.S. PATENT DOCUMENTS 3,268,314 A * 8/1966 Stephens ............... G01J 5/0022
65/159
4,130,406 A 12/1978 Wakasa et al.
(Continued)

FOREIGN PATENT DOCUMENTS

EP 1749802 A1 * 2/2007 ............. C03B 37/07
JP S5167815 U 5/1976
(Continued)

OTHER PUBLICATIONS

EP 1749802 A1 (Donaubauer) Feb. 7, 2007 (English language machine translation). [online] [retrieved Aug. 25, 2022]. Retrieved from: Espacenet. (Year: 2007).*
(Continued)

*Primary Examiner* — Erin Snelting
(74) *Attorney, Agent, or Firm* — CANTOR COLBURN LLP

(57) ABSTRACT

Provided is a method for manufacturing a glass fiber strand in which a glass fiber strand is formed by bundling a plurality of glass fiber filaments comprising molten glass drawn out from a nozzle, wherein said method for manufacturing a glass fiber strand is capable of detecting breakage of the glass fiber filaments in a more reliable manner. This method comprises: an image capturing step for generating a plurality of items of image data by continuously capturing images of a plurality of glass fiber filaments f; an image processing step for extracting, from the image data, a high luminance object having a luminance of a prescribed value or more; and a breakage detection step for detecting that a
(Continued)

glass fiber filament f has broken on the basis of the results of the image processing in the image processing step.

9 Claims, 12 Drawing Sheets

(51) Int. Cl.
*G01N 21/88* (2006.01)
*C03B 37/02* (2006.01)

(56) References Cited

U.S. PATENT DOCUMENTS

| | | | |
|---|---|---|---|
| 4,149,865 A | | 4/1979 | Coggin, Jr. et al. |
| 4,229,198 A | * | 10/1980 | Coggin, Jr. ............. C03C 25/20 65/513 |
| 4,270,942 A | | 6/1981 | Coggin, Jr. et al. |
| 4,342,580 A | * | 8/1982 | Roberson ................ C03B 37/07 65/487 |
| 4,389,574 A | * | 6/1983 | Shofner ................ C03B 37/07 250/559.43 |
| 4,401,452 A | * | 8/1983 | Eisenberg ........... C03B 37/0216 356/73.1 |
| 4,925,471 A | * | 5/1990 | Yamatsuta .......... C03B 37/0216 65/487 |

FOREIGN PATENT DOCUMENTS

| | | |
|---|---|---|
| JP | S5341521 A | 4/1978 |
| JP | S56125235 A | 10/1981 |
| JP | S5832035 A | 2/1983 |
| JP | S5992939 A | 5/1984 |
| JP | S61125132 U | 8/1986 |
| JP | H0892812 A | 4/1996 |
| JP | H08171689 A | 7/1996 |
| JP | 2005247650 A | 9/2005 |
| JP | 2017105657 A | 6/2017 |
| JP | 2018070404 A | 5/2018 |

OTHER PUBLICATIONS

International Search Report corresponding to Application No. PCT/JP2018/020422; dated Jul. 10, 2018.
CNIPA First Office Action for corresponding CN Application No. 201880027671.3; dated Oct. 9, 2021.
JPO Notice of Reasons for Refusal for corresponding JP Application No. 2019-523468; dated Mar. 8, 2022.
Partial Translation of D4 (JPS51-67815U) or JP1976067815U1 as filed on IDS dated Dec. 4, 2019 and listed on Written Opinion of the ISA for International Application PCT/JP2018/020422), dated May 28, 1976.
PCT IPRP and Written Opinion for corresponding PCT/JP2018/020422 appln; dated Dec. 10, 2019.

* cited by examiner

METHOD FOR MANUFACTURING GLASS FIBER STRAND

CROSS REFERENCE TO RELATED APPLICATIONS

This is the U.S. national stage of application No. PCT/JP2018/020422, filed on May 28, 2018. Priority under 35 U.S.C. § 119(a) and 35 U.S.C. § 365(b) is claimed from Japanese Application No. 2017-111984, filed Jun. 6, 2017, the disclosure of which is herein incorporated by reference.

TECHNICAL FIELD

The present invention relates to a technology concerning a method for manufacturing a glass fiber strand, and more particularly to a technology for more reliably detecting breakage of a glass fiber filament in the process of manufacturing the glass fiber strand.

BACKGROUND ART

Heretofore, various technologies for detecting breakage of a plurality of glass fiber filaments formed in the process of manufacturing a glass fiber strand have been studied.

For example, Patent Literature 1 discloses a technology for detecting, when any glass fiber filament being drawn out through a nozzle (orifice) of a bushing has been cut (broken), the breakage of the glass fiber filament through detection, with a radiation thermometer, of a change in luminance or radiant heat with growth of a molten glass bead generated at a tip of the nozzle in the form of an electrical signal.

CITATIONS LIST

Patent Literature

Patent Literature 1: JP S53-41521A

SUMMARY OF INVENTION

Technical Problems

With the technology disclosed in Patent Literature 1, however, when a large number of nozzles provided through the bushing causes a large variation in temperature among the nozzles, even a glass fiber filament in a normal state (state where no breakage has occurred) may be determined, depending on a temperature of the glass fiber filament, as being broken due to erroneous detection of generation of a molten glass bead, for example.

The present invention has been made in view of the above-described existing problem, and it is an object of the present invention is to provide a method for manufacturing a glass fiber strand by which a plurality of glass fiber filaments formed of molten glass being drawn out from a plurality nozzles are bound together into a glass fiber strand and that allows breakage of any of the glass fiber filaments to be detected more reliably.

Solutions to Problems

The problem to be solved by the present invention is as described above, and a description will be given below of a means for solving the problem.

That is, a method for manufacturing a glass fiber strand according to the present invention is a method by which a plurality of glass fiber filaments formed of molten glass being drawn out from a plurality of nozzles are bound together into the glass fiber strand. The method includes an imaging process of continuously imaging the plurality of glass fiber filaments to generate a plurality of pieces of image data, an image processing process of extracting a high luminance object having luminance equal to or greater than a predetermined value from the plurality of pieces of image data, and a breakage detection process of detecting breakage of any of the glass fiber filaments based on a result of image processing performed in the image processing process. In the breakage detection process, whether a position of the high luminance object has changed is detected based on the plurality of pieces of image data, and, when a result of the detection indicates that the position of the high luminance object has changed, a determination is made that any of the glass fiber filaments has been broken.

Herein, among various types of high luminance objects each having luminance equal to or greater than a predetermined value, for example, the glass fiber filaments in a normal state (state where no breakage has occurred) that drop at very high velocity (velocity at which the glass fiber strand is wound) each have luminance that is recognized as a state where no high luminance object moves with time (steady state) on each piece of image data, thereby making it possible to distinguish a molten glass bead generated from a broken glass fiber filament from such glass fiber filaments more accurately and in turn detect breakage of any of the glass fiber filament more reliably.

Further, for example, it is also possible to prevent a particle such as a water droplet that adheres to a wall and does not drop among the high luminance objects each having the luminance equal to or greater than the predetermined value from being erroneously identified as a molten glass bead as much as possible and in turn detect breakage of any of the glass fiber filaments more reliably.

Further, in accordance with the method for manufacturing a glass fiber strand according to the present invention, in the breakage detection process, a drop velocity of each of the high luminance objects is computed based on the plurality of pieces of image data, and, when the drop velocity based on the computation is equal to or greater than 1 cm/s, a determination is desirably made that any of the glass fiber filaments has been broken.

Such a configuration makes it possible to prevent a particle such as a water droplet that adheres to the wall and does not drop from being erroneously detected as breakage of any of the glass fiber filaments, distinguish a molten glass bead generated from a broken glass fiber filament more accurately, and in turn detect breakage of any of the glass fiber filaments more reliably.

Further, in accordance with the method for manufacturing a glass fiber strand according to the present invention, in the breakage detection process, the drop velocity of each of the high luminance objects is computed based on the plurality of pieces of image data, and, when the drop velocity based on the computation is equal to or less than 5 m/s, a determination is desirably made that any of the glass fiber filaments has been broken.

Such a configuration makes it possible to prevent, for example, a water droplet or the like that has luminance equal to or greater than the predetermined value and drops fast from being erroneously identified as a molten glass bead as much as possible, and in turn detect breakage of any of the glass fiber filaments more reliably.

Note that, in accordance with the method for manufacturing a glass fiber strand according to the present invention, in the imaging process, a range in an up-down direction of a to-be-imaged region of each of the plurality of pieces of image data may be set larger than a movement distance by which a molten glass bead moves and smaller than a movement distance by which a water droplet moves in a period from start of capturing a piece of image data at any given moment to start of capturing the next piece of image data.

Such a configuration makes it possible to, in the breakage detection process serving as a post-process, easily and reliably select a water droplet from among a plurality of types of high luminance objects by simply comparing at least two pieces of image data continuously captured, prevent the water droplet from being erroneously identified as a molten glass bead as much as possible, and in turn detect breakage of any of the glass fiber filaments more reliably.

Further, in accordance with the method for manufacturing a glass fiber strand according to the present invention, in the breakage detection process, a movement direction of each of the high luminance objects is identified based on the plurality of pieces of image data, and, when the movement direction is identified as a vertical direction, a determination may be made that any of the glass fiber filaments has been broken.

Such a configuration makes it possible to easily and reliably select, from among the plurality of types of high luminance objects, mist that moves in an irregular direction, prevent the mist from being erroneously identified as a molten glass bead as much as possible, and in turn detect breakage of any of the glass fiber filaments more reliably.

Further, in accordance with the method for manufacturing a glass fiber strand according to the present invention, in the imaging process, the plurality of pieces of image data are generated through imaging of the plurality of glass fiber filaments with a predetermined exposure time, the predetermined exposure time is set to a time that causes a movement distance of a molten glass bead to be shorter and causes a movement distance of a water droplet to be longer in the range in a period from start to finish of capturing of each of the pieces of image data, as compared with a range in an up-down direction of a to-be-imaged region of each of the plurality of pieces of image data, and, in the breakage detection process, a shape of a path of each of the high luminance objects is identified based on the plurality of pieces of image data, and, when the shape of the path thus identified linearly extends and has both ends located within the to-be-imaged region, a determination may be made that any of the glass fiber filaments has been broken.

Such a configuration makes it is possible to reduce an amount of image data obtained in the imaging process, and accordingly makes it possible to more easily and reliably select mist and a water droplet from among the plurality of types of high luminance objects, prevent the mist and the water droplet from being erroneously identified as molten glass beads as much as possible, and in turn detect breakage of any of the glass fiber filaments more reliably.

In accordance with the method for manufacturing a glass fiber strand according to the present invention, in the imaging process of imaging a region below a tip of each of the nozzles and below a molten glass cone at the tip to generate the plurality of pieces of image data, the region below the tip of each of the nozzles and below the molten glass cone at the tip is desirably imaged to generate the plurality of pieces of image data.

That is, for example, as long as the glass fiber filaments are in the normal state, a substantially conical molten glass cone is continuously formed at the tip of each of the nozzles.

The molten glass cone is a high luminance object having luminance equal to or greater than the predetermined value, and, when a shape of the molten glass cone is changed due to a factor other than breakage, it is highly likely that the molten glass cone is erroneously identified as a molten glass bead that is also a high luminance object.

Thus, according to the present invention, the region below the molten glass cone at the tip of each of the nozzles, more specifically, a region extending downward from an adjacent region that extends downward from the tip of each of the nozzles by at least 1 cm is imaged in advance, thereby making it possible to prevent the image of the molten glass cone from being captured in the image data as much as possible and in turn prevent the molten glass cone from being erroneously identified as a molten glass bead.

As a result, the presence of the molten glass bead makes it possible to detect breakage of any of the glass fiber filaments more reliably.

Advantageous Effects of Invention

The effects of the present invention are as follows.

That is, according to the method for manufacturing a glass fiber strand according to the present invention, breakage of a glass fiber filament can be detected more reliably.

DESCRIPTION OF EMBODIMENTS

Figure 1:
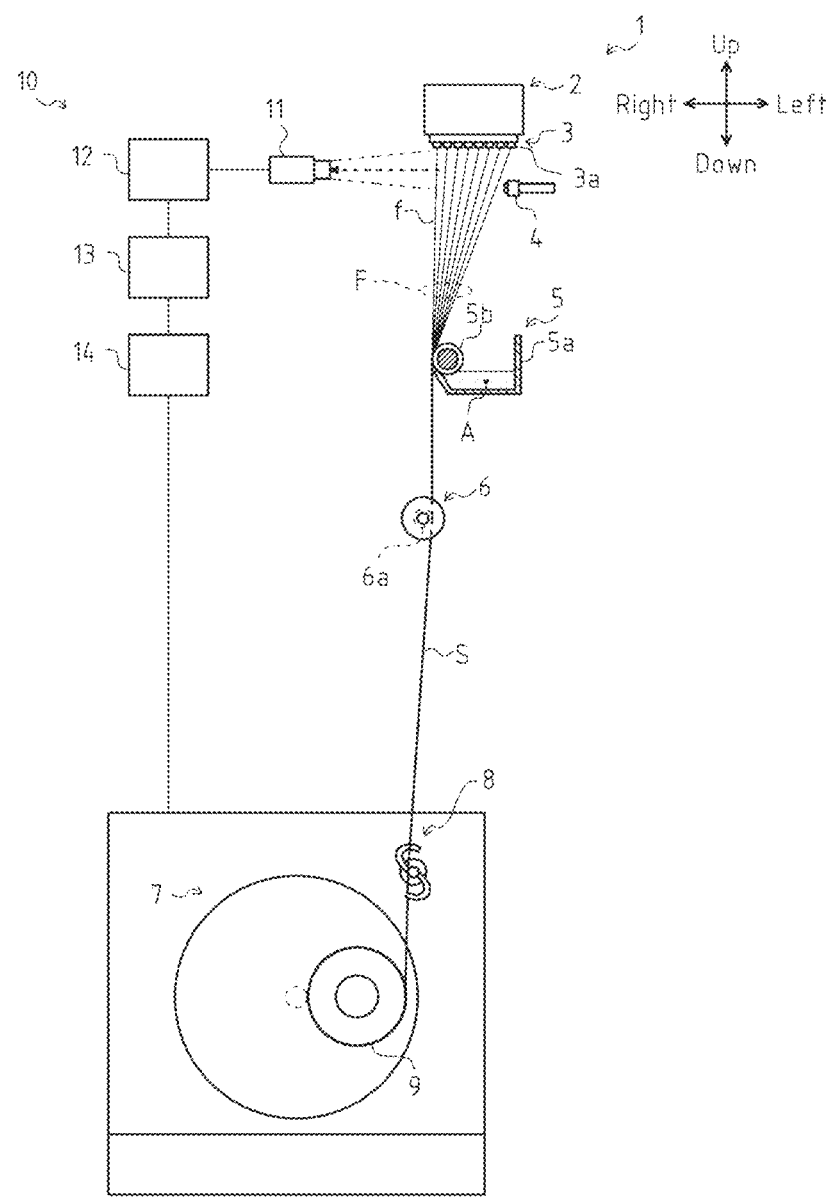
FIG. 1 is a front view showing an overall structure of a glass fiber manufacturing apparatus embodying the present invention.

Next, a description will be given of embodiments of the present invention with reference to FIG. 1 to FIG. 11.

Note that, the following description will be given, for the sake of convenience, with an up-down direction, a front-rear direction, and a left-right direction of a glass fiber manufacturing apparatus 1 defined by directions of arrows shown in FIG. 1 to FIG. 3B.

Further, in FIG. 5A to FIG. 6C, and FIG. 8A and FIG. 8B, the up-down direction of the drawing is defined as an up-down direction of a bushing 3.

[Outline of Method for Manufacturing Glass Fiber Strand S]

First, a description will be given of an outline of a method for manufacturing a glass fiber strand S according to the present invention with reference to FIG. 1 and FIG. 6A to FIG. 6C.

The method for manufacturing a glass fiber strand S embodied by the present embodiment is a method by which a plurality of glass fiber filaments f continuously formed are bound together into the glass fiber strand S and in which breakage of any of the glass fiber filaments f in the process of being formed can be detected more reliably.

Herein, the glass fiber strand S is generally manufactured in accordance with the following procedure.

Figure 6A:
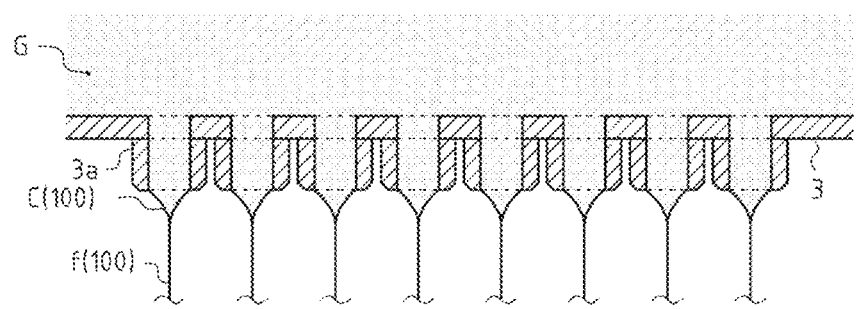
FIG. 6A to FIG. 6C are diagrams showing how glass fiber filaments are drawn out, FIG. 6A being a schematic diagram showing a plurality of glass fiber filaments in a normal state (state where no breakage has occurred), FIG. 6B being a schematic diagram showing a state where any of the glass fiber filaments has been broken, and a molten glass bead has been generated, and FIG. 6C being a schematic diagram showing a state where any of the glass fiber filaments has been broken at a position on a rear side, and a molten glass bead has been generated.

That is, a melting furnace (not shown) is provided upstream of a feeder 2 in FIG. 1, and as shown in FIG. 6A, molten glass G melted by the melting furnace is continuously drawn downward from a plurality of nozzles 3a provided in the bushing 3.

At this time, the molten glass G forms substantially conical molten glass cones C and is drawn out as the thread-like glass fiber filaments f extending from lower ends of the molten glass cones C.

Thereafter, the plurality of glass fiber filaments f thus drawn out are bound together into a single string, and, as a result, the glass fiber strand S (see FIG. 1) is manufactured.

Figure 6B:
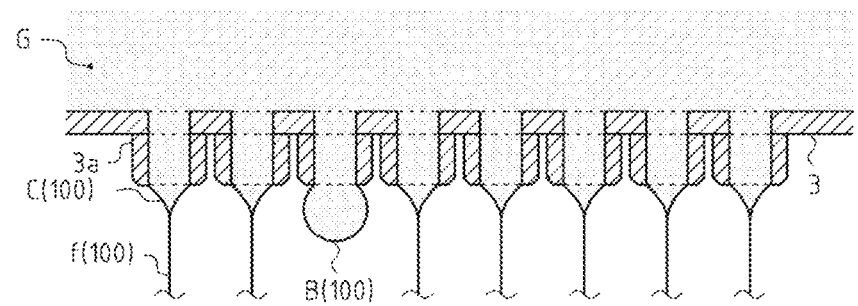

When the glass fiber strand S is manufactured by such a manufacturing method, as shown in FIG. 6B, any of the glass fiber filaments f drawn out from the bushing 3 may be broken, and, at a portion where the breakage has occurred, a molten glass bead B is formed rather than the molten glass cone C and the glass fiber filament f.

Note that the molten glass bead B is formed of the molten glass G that is drawn out from the bushing 3, but fails to become a thread and is expanded into a substantially spherical shape.

Figure 6C:
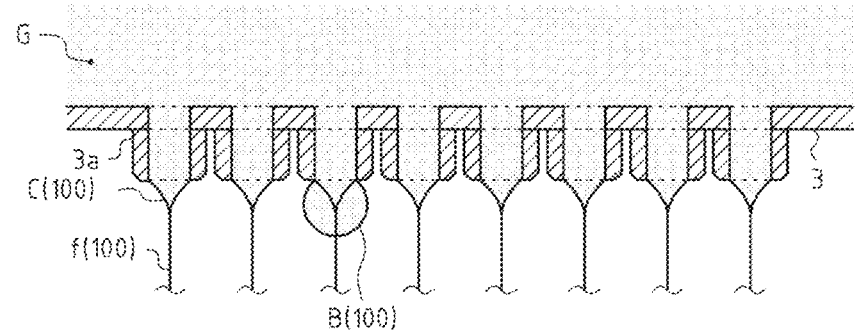

Further, when any of the glass fiber filaments f is broken at a position on a rear side of the bushing 3, the molten glass bead B as shown in FIG. 6C appears, but even when the glass fiber filament f and the molten glass bead B overlap each other in a visual direction, the appearance of the molten glass bead B can be easily recognized.

Herein, the molten glass G is heated to a high temperature to be red-hot and accordingly becomes high in luminance.

Further, the bushing 3 is heated together with the molten glass G to a high temperature to be red-hot and accordingly becomes high in luminance.

On the other hand, as being separated from the bushing 3, the glass fiber filaments f are naturally cooled and accordingly become lower in luminance than the molten glass G.

The glass fiber filaments f are, however, drawn downward at high velocity while shaking, which causes radiant light from the bushing 3 to be reflected off the shaking glass fiber filaments f and become highly bright.

Further, each of the molten glass cones C formed when the molten glass G is drawn out from the nozzles 3a of the bushing 3 is heated to be red-hot and accordingly becomes high in luminance.

Furthermore, the molten glass bead B formed when any of the glass fiber filaments f has been broken is also heated to be red-hot and accordingly becomes high in luminance.

Note that the molten glass bead B grows and then drops from the bushing 3, and is naturally cooled as being separated from the bushing 3, but the molten glass bead B is larger in diameter than each of the glass fiber filaments f and is accordingly cooled in a gradual manner. As a result, even after being separated from the bushing 3, the molten glass bead B remains high in luminance as compared with each of the glass fiber filaments f.

Thus, in accordance with the method for manufacturing a glass fiber strand S according to the present embodiment, as described later, a plurality of pieces of image data are obtained by imaging a predetermined region immediately below the bushing 3 at high speed, and image processing is performed on the pieces of image data thus obtained to extract objects 100 having luminance equal to or greater than a predetermined value (hereinafter, referred to as "high luminance objects 100" as needed). Of the plurality of types of high luminance objects 100 thus extracted (the glass fiber filament f, the molten glass cone C, the molten glass bead B, and the like), a moving high luminance object 100 is identified as the molten glass bead B, thereby detecting that any of the glass fiber filaments f has been broken.

More specifically, according to the present embodiment, the predetermined region immediately below the bushing 3 is imaged at high speed, so that the pieces of image data is obtained while avoiding imaging the bushing 3 having luminance equal to or greater than the predetermined value.

Further, as a result of the image processing performed on the pieces of image data thus obtained, not only the molten glass bead B but also the glass fiber filament f in the normal state (state where no breakage has occurred) and, in some case, the molten glass cone C extracted as high luminance objects 100 may be recognized as the molten glass beads B.

However, since the molten glass cone C does very little movement and has luminance equal to or greater than the predetermined value while staying in the same place, and the glass fiber filament f drops at very high velocity (spinning velocity) and is recognized as a high luminance object 100 in a state (steady state) where the high luminance object 100 never moves even with time on each piece of image data because there is no change in luminance even with time at any position on a spinning path of the glass fiber filament f as long as the glass fiber filament f is in the normal state, only a high luminance object 100 that moves at a drop velocity equal to or greater than a predetermined value is identified as the molten glass bead B.

The above configuration prevents, in accordance with the method for manufacturing a glass fiber strand S according to the present embodiment, the bushing 3, the molten glass cone C, the glass fiber filament f in the normal state, and the like from being erroneously identified as the molten glass beads B as much as possible and thus makes it possible to more reliably detect breakage of the glass fiber filament f in the process of being formed.

[Overall Structure of Glass Fiber Manufacturing Apparatus 1]

Next, a description will be given of an overall structure of the glass fiber manufacturing apparatus 1 (hereinafter, simply referred to as a "manufacturing apparatus 1") embodying the method for manufacturing a glass fiber strand S according to the present invention with reference to FIG. 1 to FIG. 3B.

As shown in FIG. 1, the manufacturing apparatus 1 is an apparatus configured to binding the plurality of glass fiber filaments f together into the glass fiber strand S.

The manufacturing apparatus 1 primarily includes the feeder 2, the bushing 3, a spray nozzle 4, an applicator 5, a binding roller 6, a winder 7, a traverse mechanism 8, and a control means 10 configured to control the overall operation of the manufacturing apparatus 1 and detect breakage of any of the glass fiber filaments f.

The feeder 2 is a tank-shaped member where the molten glass G (see FIG. 5A and FIG. 5B) melted by the melting furnace (not shown) is supplied and temporarily stored.

The bushing 3 is disposed on a bottom of the feeder 2.

The bushing 3 is a platinum-made member where a plurality of holes (not shown) are arranged in a matrix having a plurality of rows and columns.

The plurality of nozzles 3a each having a hollow portion communicating with a corresponding one of the above-described holes are provided protruding from a lower surface of the bushing 3.

The spray nozzle 4 is a member configured to spray a coolant to a bundle of the glass fiber filaments f (hereinafter, referred to as "glass fiber filament bundle F" as needed) each drawn out from a corresponding one of the plurality of nozzles 3a of the bushing 3.

Note that the glass fiber filament bundle F is cooled by the coolant sprayed from the spray nozzle 4.

The applicator 5 is a member configured to apply a binding agent A to the glass fiber filament bundle F before being bound together.

The applicator 5 includes a tray 5a where the binding agent A is stored, an application roller 5b configured to apply the binding agent A to the glass fiber filament bundle F in contact with the glass fiber filament bundle F, and the like.

The binding roller 6 is a member configured to bind the glass fiber filament bundle F together.

Figure 2:
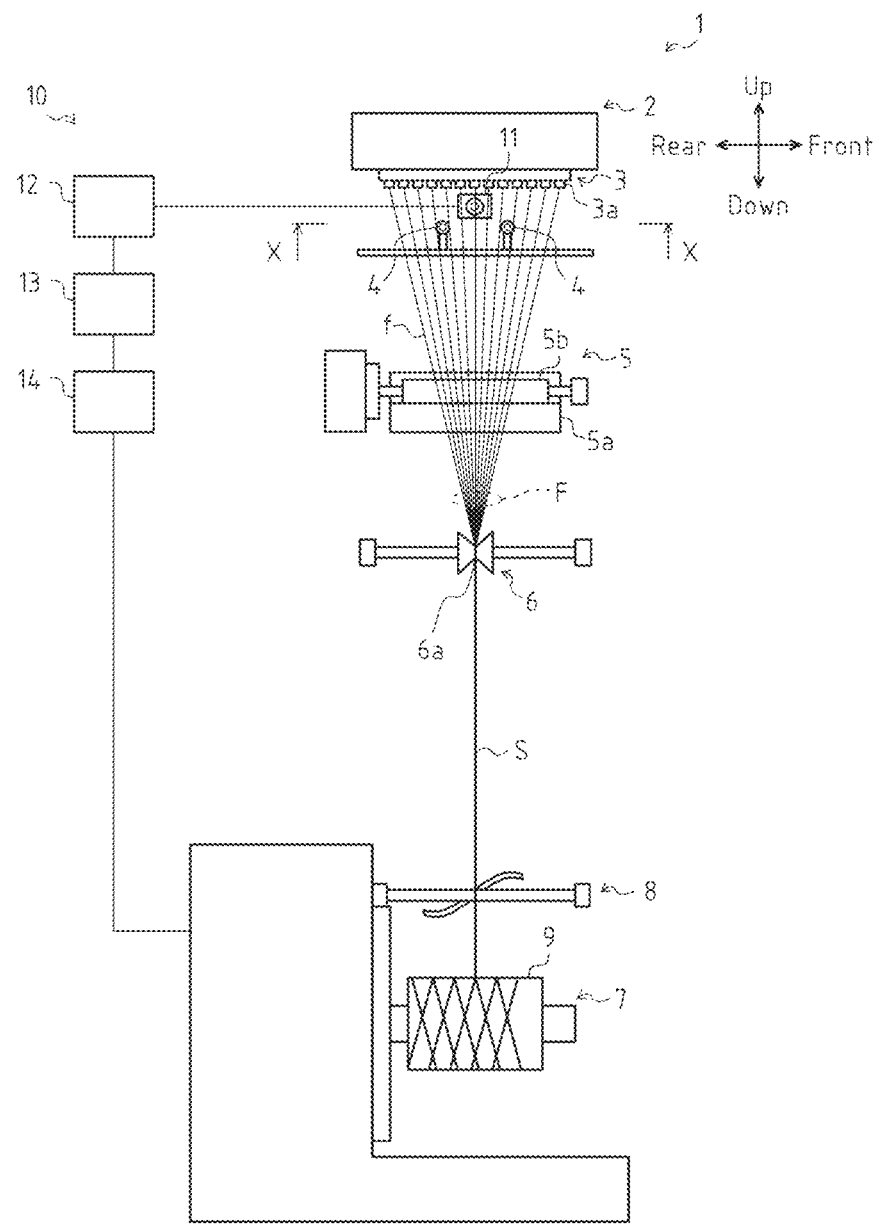
FIG. 2 is a side view showing the overall structure of the glass fiber manufacturing apparatus embodying the present invention.

Herein, as shown in FIG. 2, formed at a center in an axial direction of the binding roller 6 is a binding part 6a having a center portion smaller in diameter than both end portions.

Then, the glass fiber filament bundle F is gathered and bound together by the binding part 6a so as to become the glass fiber strand S in the form of a single string.

The winder 7 is a device configured to rotate a collet 9 around an axis of the winder 7 to wind the glass fiber strand S around the collet 9.

The winder 7 includes the traverse mechanism 8 configured to cause the glass fiber strand S to be evenly wound around the collet 9 disposed on the winder 7 while traversing the collet 9.

In the manufacturing apparatus 1 having the above-described structure, the molten glass G melted by the melting furnace (not shown) is supplied to the feeder 2 and drawn out through the plurality of nozzles 3a provided on the lower surface of the bushing 3 so as to become the plurality of glass fiber filaments f.

Then, the plurality of glass fiber filaments f thus formed, that is, the glass fiber filament bundle F, have the binding agent A (see FIG. 1) applied by the applicator 5 and are then wound around the collet 9 by the winder 7 while being bound together by the binding roller 6.

In accordance with such a procedure, the glass fiber strand S is manufactured by the manufacturing apparatus 1.

In the manufacturing apparatus 1 according to the present embodiment, the control means 10 is provided as described above, the control means 10 being configured to control the overall operation of the manufacturing apparatus 1 and to detect breakage of any of the glass fiber filaments f in the process of being formed.

Herein, the control means 10 primarily includes a camera 11 serving as an imaging means, an image processor 12 configured to perform image processing on image data captured by the camera 11, a detector 13 configured to identify the molten glass bead B (see FIG. 5A and FIG. 5B) based on a result of the image processing performed by the image processor 12 to detect breakage of any of the glass fiber filaments f, a controller 14 configured to control the overall operation of the manufacturing apparatus 1 in accordance with an electrical signal sent from the detector 13, and the like.

The camera 11 may be constituted by, for example, a commercially available digital high-speed camera capable of high-speed imaging.

Further, in such a digital high-speed camera, any image sensor such as a CCD image sensor or a CMOS image sensor may be contained.

According to the present embodiment, the camera 11 is disposed at a position where the camera 11 can capture the glass fiber filament bundle F immediately after being drawn out from the plurality of nozzles 3a provided on the bushing 3.

Figure 3A:
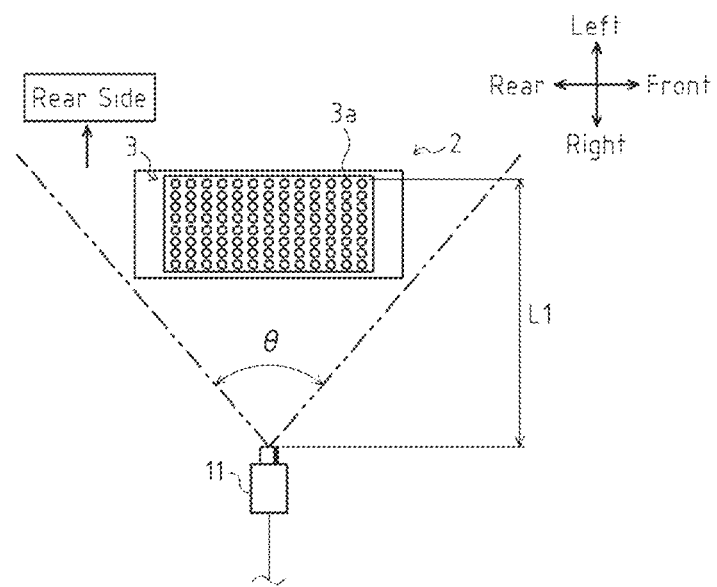
FIG. 3A and FIG. 3B are diagrams showing a positional relation between a feeder and a camera as viewed from a direction of arrow X in FIG. 2, FIG. 3A being a layout diagram showing a positional relation between the feeder and the camera according to the present embodiment, and FIG. 3B being a layout diagram showing a positional relation between the feeder and the camera according to the conventional art.

Specifically, as shown in FIG. 3A, when a length in the front-rear direction of the bottom of the bushing 3 is longer than a length in the left-right direction, the camera 11 is disposed facing one side in a lateral direction of the bushing 3 (a right side according to the present embodiment).

The camera 11 is set to have a sufficiently wide angle of view θ that allows the plurality of nozzles 3a to simultaneously lie within a to-be-imaged region. Note that when it is difficult for the camera 11 to have a sufficiently wide angle of view θ, a plurality of cameras may be used.

Figure 3B:
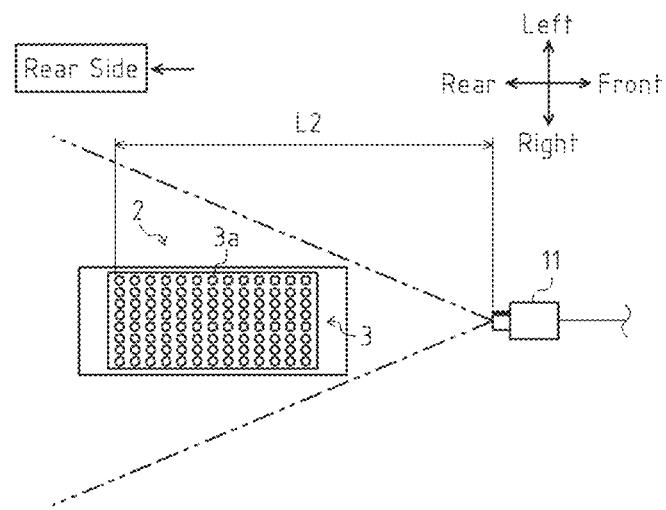

Note that the position at which the camera 11 is disposed is not limited to the above position, and for example, as shown in FIG. 3B, the camera 11 may be disposed facing one side (for example, a front side) in a longitudinal direction of the bushing 3.

However, when the camera 11 is disposed at the position shown in FIG. 3B, a separation distance L2 between the camera 11 and nozzles 3a disposed on a rear side that is the farthest from the camera 11 becomes long, which may result in unclear detection of a state of glass fiber filaments f drawn out from the nozzles 3a disposed on the rear side.

Thus, according to the present embodiment, the camera 11 is disposed at the position as shown in FIG. 3A, and as a result, a separation distance L1 between the camera 11 and nozzles 3a disposed on a rear side that is the farthest from the camera 11 is shorter than the separation distance L2 between the camera 11 and the nozzles 3a disposed on the rear side that is the farthest from the camera 11 as shown in FIG. 3B (L1<L2), which makes it possible to detect, more clearly, the state of glass fiber filaments f drawn out from the nozzles 3a disposed on the rear side that is the farthest from the camera 11.

Note that, the manufacturing apparatus 1 according to the present embodiment is capable of manufacturing one glass fiber strand S, but is not limited to such a configuration. The manufacturing apparatus 1 may be capable of manufacturing at least two glass fiber strands S simultaneously.

Such a configuration may allow a plurality of cameras 11 to be arranged one by one for each glass fiber strand S, or alternatively allow one camera 11 to take an image of the at least two glass fiber strands S.

Further, according to the present embodiment, the configuration where the glass fiber manufacturing apparatus 1 is provided with one camera 11 for one glass fiber strand S has been given as an example, but the glass fiber manufacturing apparatus 1 is not limited to such a configuration, and a configuration where a plurality of (for example, two) cameras 11 take images of left and right sides of one glass fiber strand S may be employed, for example.

Then, the manufacturing apparatus 1 is configured to cause the camera 11 to continuously take an image of the glass fiber filament bundle F immediately after being drawn out from the bushing 3 to generate image data capturing the glass fiber filaments f in the normal state (state where no breakage has occurred), the molten glass bead B formed in place of the glass fiber filament f that has been broken, and the like.

In FIG. 1, the image processor 12 is a device configured to perform image processing on the plurality pieces of image data captured by the camera 11, and, as described later, is capable of extracting, from each piece of image data, various types of high luminance objects 100 having luminance equal to or greater than a predetermined threshold (see FIG. 6A to FIG. 6C).

Note that, as the image processor 12, a general-purpose personal computer that includes an interface connected to the camera 11, a storage device such as a ROM, a RAM, an HDD, a processing unit (CPU), a display device, and the like and has a predetermined image processing program installed therein may be used.

The detector 13 is configured, as described later, to identify the molten glass bead B (see FIG. 6A to FIG. 6C) from among various types of high luminance objects 100 extracted by the image processor 12 to detect breakage of any of the glass fiber filaments f.

Note that, as the detector 13, a general-purpose personal computer that includes an interface connected to the image processor 12, a storage device such as a ROM, a RAM, an HDD, a processing unit (CPU), a display device, and the like and has a predetermined breakage detection program installed therein may be used.

The method for manufacturing a glass fiber strand S according to the present embodiment is configured to cause the control means 10 having the above configuration to accurately identify the molten glass bead B formed to more reliably detect breakage of any of the glass fiber filaments f in the process of being formed.

[Method for Detecting Breakage of Glass Fiber Filament f]

Next, a description will be given in detail of a method for detecting breakage of any of the glass fiber filaments f in the process of being formed in accordance with the method for manufacturing a glass fiber strand S embodied by the present embodiment with reference to FIG. 4, FIG. 5A, and FIG. 5B.

Figure 4:
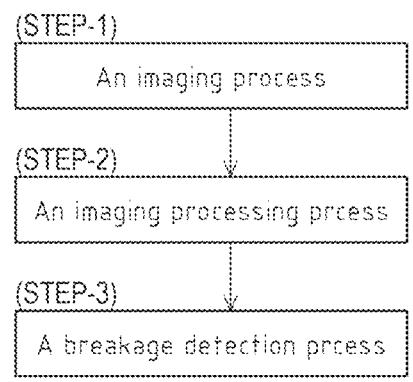
FIG. 4 is a flowchart sequentially showing steps of detecting breakage of a glass fiber filament in accordance with the method of manufacturing a glass fiber strand according to the present invention.

As shown in FIG. 4, the method for detecting breakage of any of the glass fiber filament f according to the present embodiment primarily includes an imaging process (STEP-1), an image processing process (STEP-2), a breakage detection process (STEP-3), and the like that are sequentially performed.

The imaging process (STEP-1) is a process of imaging the plurality of glass fiber filaments f to generate image data.

Figure 5A:
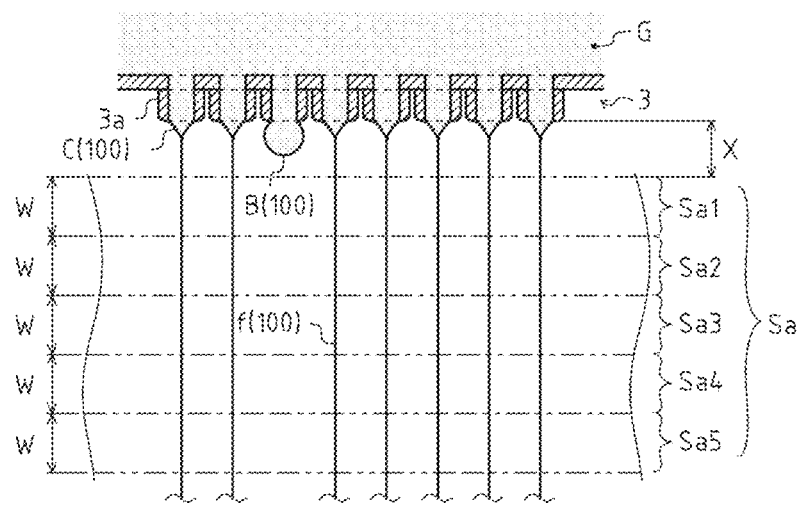
FIG. 5A and FIG. 5B are diagrams for describing an image processing method implemented by an image processor, FIG. 5A being a schematic diagram showing a state where a generated molten glass bead is about to drop, and FIG. 5B being a schematic diagram showing a state where a dropped molten glass bead has just passed through a to-be-imaged region.

Specifically, as shown in FIG. 5A, under a situation where the glass fiber strand S is manufactured by the manufacturing apparatus 1 (see FIG. 1), the imaging process (STEP-1) is performed in which the camera 11 takes an image of, at high speed, a region where the plurality of glass fiber filaments f immediately after being drawn out from the nozzles 3a moves downward within a to-be-imaged region Sa of the camera 11, and image data corresponding to raw data (image data immediately after being captured and not subjected to image processing) is generated.

Note that, in the imaging process (STEP-1), a plurality of pieces of image data are continuously generated at equal time intervals.

For example, in the imaging process (STEP-1), 10 to 100 pieces of image data are generated per second (at $\frac{1}{100}$ to $\frac{1}{10}$ seconds interval).

Then, the plurality of pieces of image data generated by the camera 11 are each converted into an electrical signal and transmitted to the image processor 12.

Note that the plurality of pieces of image data may be transmitted to the image processor 12 sequentially or simultaneously.

Herein, the pieces of image data according to the present embodiment may be generated by imaging a region extending downward from an adjacent region that extends downward from a tip of each of the nozzles 3a by a predetermined dimension X (1 cm according to the present embodiment).

However, the present invention is not limited to such a configuration, and the pieces of image data may be generated, for example, by imaging a region that includes the above-described adjacent region and extends downward from the tip of each of the nozzles 3a by a predetermined distance.

However, as described above, as long as the glass fiber filaments f are in the normal state (state where no breakage has occurred), the substantially conical molten glass cone C is continuously formed at the tip of each of the nozzles 3a.

As a result, since the molten glass cone C is a high luminance object 100 having luminance equal to or greater than the predetermined value, when the shape of the molten glass cone C changes due to a factor other than breakage, the molten glass cone C may be erroneously identified as the molten glass bead B that is also a high luminance object 100 in the breakage detection process (STEP-3) to be described later.

Thus, according to the present embodiment, since the region extending downward from the adjacent region that extends downward from the tip of each of the nozzles 3a by at least 1 cm is imaged, it is possible to prevent an image of the molten glass cone C from being contained in the pieces of image data as much as possible and thus prevent the molten glass cone C from being erroneously identified as the molten glass bead B.

As a result, as described later, the presence of the molten glass bead B makes it possible to detect breakage of any of the glass fiber filaments f more reliably.

In the meantime, when any of the glass fiber filaments f is broken unexpectedly, the pieces of image data generated contain not only an image of the other glass fiber filaments fin the normal state but also an image of a dropping molten glass bead B.

At this time, even when any of the glass fiber filaments f has been broken at a position on a rear side further remote from the camera 11 as described above, the molten glass bead B overlapping the glass fiber filament f can be easily recognized due to its appearance (see FIG. 6C), thereby allowing the image of the dropping molten glass bead B to be reliably contained in the pieces of image data regardless of the location where the breakage has occurred.

Herein, the to-be-imaged region Sa of the camera 11 can be divided in advance into a plurality of regions, and according to the present embodiment, for example, the to-be-imaged region Sa is divided into a five regions including a first to-be-imaged region Sa1 to a fifth to-be-imaged region Sa5 set in order from the top.

Then, within the to-be-imaged region Sa of each of the plurality of pieces of image data continuously generated at equal time intervals, the dropping molten glass bead B gradually moves downward in step with imaging times.

Figure 5B:
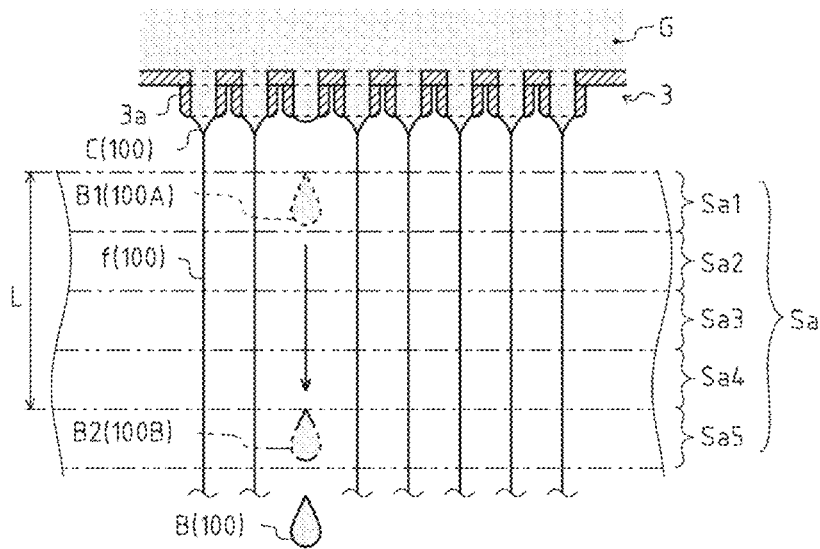

For example, as shown in FIG. 5B, the dropping molten glass bead B is at a position of a first molten glass B1 within the first to-be-imaged region Sa1 in a piece of image data captured at any given time t1, and moves to a position of a second molten glass bead B2 within the fifth to-be-imaged region Sa5 at a time t2 (equal to t1+Δt).

As described later, according to the present embodiment, whether the position of the molten glass bead B changes is determined, and the drop velocity of the molten glass bead B is computed in the breakage detection process (STEP-3) based on imaging time information on each piece of image data and position information on the molten glass bead B.

Next, a description will be given in more detail of the image processing process (STEP-2).

The image processing process (STEP-2) is a process of performing image processing on the pieces of image data generated in the imaging process (STEP-1) to extract high luminance objects 100 having luminance equal to or greater than the predetermined value.

The image processing process (STEP-2) is performed by the image processor 12.

In the image processor 12, a luminance extraction program for extracting luminance at each position in the pieces of image data that is raw data and extracting, based on the luminance at each position thus extracted, objects having luminance equal to or greater than the predetermined value (threshold) as high luminance objects 100, and the like are stored.

Then, upon receiving the plurality of pieces of image data in the form of electrical signals from the camera 11, the image processor 12 extracts luminance at each position in the plurality of pieces of image data, extracts various types of high luminance objects 100 each having luminance equal to or greater than the predetermined value (threshold), and then holds their respective positions of the high luminance objects 100.

Thereafter, the image processor 12 converts pieces of data representing the high luminance objects 100 thus extracted into electrical signals and transmits the electrical signals to the detector 13.

Note that the plurality of pieces of data may be transmitted to the detector 13 sequentially or simultaneously.

The threshold of luminance set in the luminance extraction computation program is set to a value lower than at least luminance of the molten glass bead B.

As a result, the high luminance objects 100 extracted from the pieces of image data by the image processor 12 are not limited to the molten glass beads B, but include the glass fiber filaments fin the normal state that are drawn downward at high velocity, and, in some case, particles that adheres to a wall and do not drop.

Next, a description will be given in more detail of the breakage detection process (STEP-3).

The breakage detection process (STEP-3) is a process of detecting breakage of any of the glass fiber filaments f based on a result of the image processing performed in the image processing process (STEP-2).

The breakage detection process (STEP-3) is performed by the detector 13.

Herein, in the detector 13, a breakage detection program for determining whether the molten glass bead B is present based on the plurality of pieces of image data and detecting breakage of any of the glass fiber filaments f based on the presence of the molten glass bead B, and the like are stored.

Then, upon receiving the pieces of data representing the high luminance objects 100 in the form of electrical signals from the image processor 12, the detector 13 determines whether the molten glass bead B is present based on their respective positions of the high luminance objects 100 in the plurality of pieces of image data.

Specifically, their respective positions of the high luminance objects 100 in the plurality of pieces of image data are compared with each other, and when there is a change in the position of any of the high luminance objects 100, the high luminance object 100 whose position has changed is determined as the molten glass bead B.

Thereafter, when a result of the determination indicates the presence of the molten glass beads B, the detector 13 determines that breakage of any of the glass fiber filaments f has been detected.

Then, the detector 13 transmits, to the controller 14, an electrical signal to interrupt the formation of the glass fiber strand S.

As described above, although it is possible to determine the molten glass bead B based on the change in position of each of the high luminance objects 100, the drop velocity of each of the various types of high luminance objects 100 is computed based on the result of the image processing in the image processing process (STEP-2) serving as preprocessing, and the molten glass bead B may be identified from among the high luminance objects 100 based on the computation result.

The drop velocity of each high luminance object 100 is computed by the following method.

That is, as described above, in the imaging process (STEP-1), a dropping high luminance object 100 gradually moves downward in step with imaging times.

Herein, as shown in FIG. 5A, division ranges (ranges arranged in the up-down direction according to the present embodiment) including the first to-be-imaged region Sa1 to the fifth to-be-imaged region Sa5 that results from dividing the to-be-imaged region Sa are identical to each other and have a predetermined width (dimension W in FIG. 5A).

Further, an imaging time interval of the camera 11 is always constant.

Thus, for example, as shown in FIG. 5B, when, in a piece of image data captured at any given time t1, the high luminance object 100 located within the first to-be-imaged region Sa1 is extracted as a first high luminance object 100A, and, in a piece of image data captured at the time t2 (equal to t1+Δt), the high luminance object 100 located within the fifth to-be-imaged region Sa5 is extracted as a second high luminance object 100B, a drop distance (L) of the high luminance object 100 is computed to be equal to a total of their respective to-be-imaged ranges of the first to-be-imaged region Sa1 to the fourth to-be-imaged region Sa4 (L=W+W+W+W).

The drop velocity (V) of the high luminance object 100 is computed by dividing the drop distance (L) by a drop time (Δt) (V=L/Δt).

According to the present embodiment, based on the drop velocity (V) that is the computation result thus obtained, the molten glass bead B is identified from among the various types of high luminance objects 100.

That is, according to the present embodiment, when the drop velocity (V) of the high luminance object 100 that is the computation result is at least 1 cm/s, the high luminance object 100 is identified as the molten glass bead B, a determination is made that any of the glass fiber filaments f has been broken, and the formation of the glass fiber strand S is interrupted.

Note that, in order to prevent particles and the like adhering to the wall from being erroneously determined as breakage of any of the glass fiber filaments f, when the drop velocity (V) of the high luminance object 100 that is the computation result is at least 1 cm/s, the high luminance object 100 is desirably identified as the molten glass bead B, and it is more desirable that it be at least 3 cm/s.

Such a configuration allows the molten glass bead B generated from a broken glass fiber filament f to be more accurately distinguished from, for example, the glass fiber filaments f in the normal state that drop at very high velocity out of the various types of high luminance objects 100, and thus allows the breakage of the glass fiber filament f to be more reliably detected.

That is, since the degrees of luminance of the glass fiber filaments f in the normal state that drop at very high velocity are substantially identical to each other as long as the glass fiber filaments f are in the normal state, it is recognized as a state where no high luminance object 100 moves even with time (steady state) on each piece of image data, thereby making it possible to more accurately distinguish the molten glass bead B generated from the broken glass fiber filament f from the glass fiber filaments f in the normal state.

Further, for example, it is also possible to prevent a water droplet or dust that adheres to the wall and does not drop of the high luminance objects 100 each having luminance equal to or greater than the predetermined value from being erroneously identified as the molten glass bead B as much as possible and in turn detect breakage of any of the glass fiber filaments f more reliably.

Further, according to the present embodiment, an upper limit value of the drop velocity (V) of the high luminance object 100 that is applied to the determination of whether any of the glass fiber filaments f has been broken is set to 5 m/s or less.

That is, such a water droplet may become highly bright by the radiant light from the bushing 3. Therefore, when a particle adhering to the wall drops, an erroneous determination may be made that any of the glass fiber filaments f has been broken.

On the other hand, the water droplet is higher in drop velocity than the molten glass bead B.

Thus, as described in the present embodiment, setting the upper limit value of the drop velocity (V) of the high luminance object 100 to 5 m/s or less makes it possible to prevent an object such as a water droplet that has luminance equal to or greater than the predetermined value and drops fast from being erroneously identified as the molten glass bead B as much as possible and in turn detect breakage of any of the glass fiber filaments f more reliably.

Note that it is desirable that the upper limit value of the drop velocity (V) of the high luminance object 100 be set to 1 m/s or less.

Method for Detecting Breakage of Glass Fiber Filament f According to Different Embodiment Next, a description will be given in detail of a method for detecting breakage of any of the glass fiber filaments f according to a different embodiment with reference to FIG. 7 to FIG. 11.

The method for detecting breakage of any of the glass fiber filaments f in the process of being formed according to the different embodiment is implemented by the same apparatus as the glass fiber manufacturing apparatus 1 according to the above-described embodiment and has a procedure that is substantially identical to the procedure of the method for detecting breakage according to the above-described embodiment, but is different from the method for detecting breakage according to the above-described embodiment in that a relation between a frame rate and a range in the up-down direction of a to-be-imaged region Sb (see FIG. 8A and FIG. 8B) of the camera 11 (see FIG. 1) is optimized, a difference between degrees of luminance is computed based on pieces of image data continuously captured by the camera 11 to extract high luminance objects 100, and differences in movement direction or movement velocity among the high luminance objects 100 are distinguished from each other to identify the molten glass bead B.

That is, the high luminance objects 100 include not only the molten glass bead B but also a water droplet D adhering to the wall or around of any of the nozzles 3a (see FIG. 8A and FIG. 8B), mist M generated by evaporation of the water droplet D due to radiant heat, or the like, and thus identifying a type of each of the high luminance objects 100 enhances accuracy of breakage detection.

Herein, since the water droplet D is higher in drop velocity than the molten glass bead B, in accordance with the method for detecting breakage according to the different embodiment, the optimization of the relation between the frame rate and the range in the up-down direction of the to-be-imaged region Sb of the camera 11 prevents the water droplet D higher in drop velocity from successively appearing in at least two pieces of image data continuously captured, and the water droplet D is selected from among the plurality of types of high luminance objects 100.

Further, unlike the molten glass beads B and the water droplet D that drop in the vertical direction by gravity, the mist M floats in any direction under the influence of not only gravity but also air flow or the like, and thus, in accordance with the method for detecting breakage according to the different embodiment, a determination is made of whether the movement direction of the high luminance object 100 extracted based on the difference in luminance is the vertical direction, and then the mist M is selected from among the plurality of types of high luminance objects 100.

As described above, in accordance with the method for detecting breakage according to the different embodiment, the water droplet D and the mist M are selected from among the plurality of high luminance objects 100 to allow only the molten glass bead B to be more reliably identified, and the presence of the molten glass bead B makes it possible to detect breakage of any of the glass fiber filaments f more reliably.

Note that a description will be given below mainly of differences from the method for detecting breakage according to the above-described embodiment, and no description will be given of contents equivalent to the method for detecting breakage.

Figure 7:
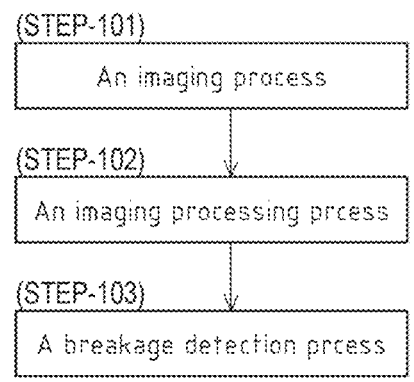
FIG. 7 is a flowchart sequentially showing steps of detecting breakage of a glass fiber filament according to a different embodiment in accordance with the method for manufacturing a glass fiber strand according to the present invention.

As shown in FIG. 7, the method for detecting breakage of any of the glass fiber filaments f according to the different embodiment primarily includes an imaging process (STEP-101), an image processing process (STEP-102), a breakage detection process (STEP-103), and the like that are sequentially performed.

The imaging process (STEP-101) is a process of imaging the plurality of glass fiber filaments f to generate image data.

Figure 8A:
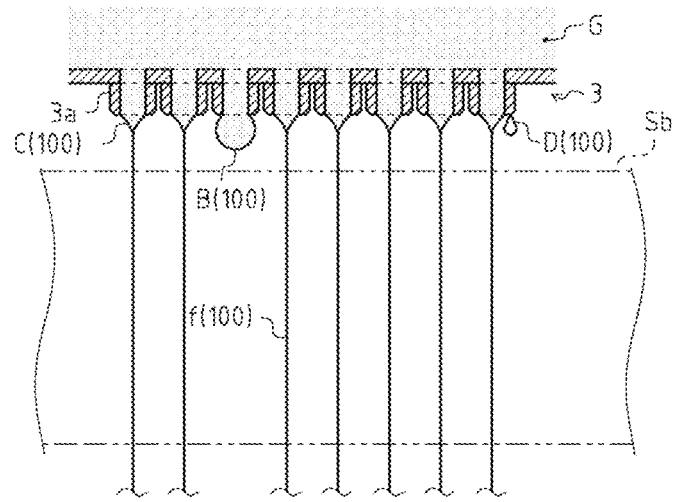
FIG. 8A and FIG. 8B are diagrams for describing an image processing method implemented by an image processor according to the different embodiment of the method for manufacturing a glass fiber strand according to the present invention, FIG. 8A being a schematic diagram showing a state where a generated molten glass bead and water droplet are about to drop, and FIG. 8B being a schematic diagram showing a state where a dropped molten glass bead and water droplet has passed through a to-be-imaged region, and mist has been generated in the to-be-imaged region.

In the imaging process (STEP-101), as shown in FIG. 8A, under a situation where the glass fiber strand S is manufactured by the manufacturing apparatus 1, a region where the plurality of glass fiber filaments f immediately after being drawn out from the nozzles 3a move downward is defined as the to-be-imaged region Sb.

Then, the imaging process (STEP-101) is performed in which the camera 11 continuously takes an image of (images) the to-be-imaged region Sb at equal time intervals and at high speed to generate a plurality of pieces of image data that is raw data.

Herein, in the imaging process (STEP-101) according to the different embodiment, the frame rate of the camera 11 is set to, for example, 30 to 60 fps in view of the throughput of the image processor 12 and the like, and thus 30 to 60 pieces of image data are generated per second (at $\frac{1}{60}$ to $\frac{1}{30}$ seconds interval).

Further, based on the frame rate of the camera 11, the range in the up-down direction of the to-be-imaged region Sb (dimension Y in FIG. 8B) is set to about 100 mm so as to prevent the water droplet D higher in drop velocity than the molten glass bead B from successively appearing in at least two pieces of image data continuously captured.

Figure 8B:
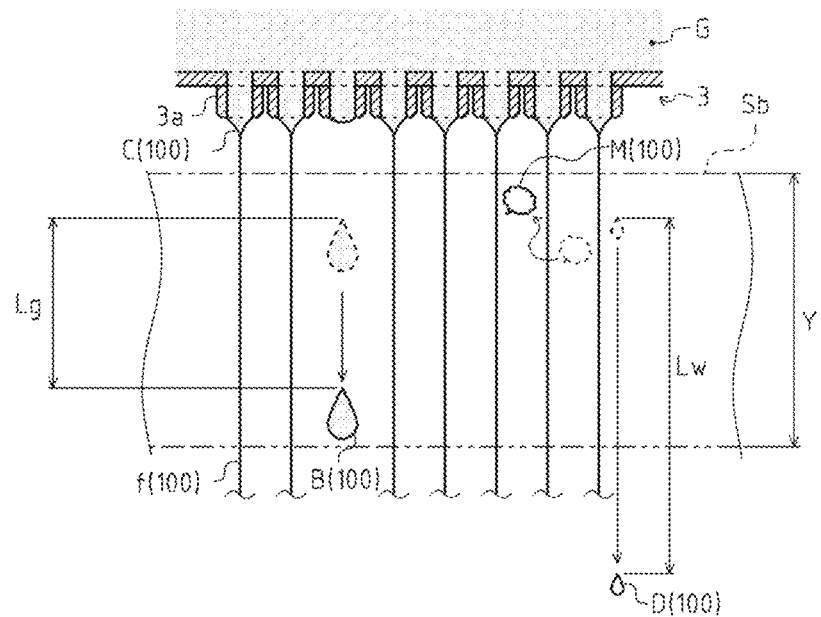

Specifically, as shown in FIG. 8B, the range in the up-down direction (dimension Y) of the to-be-imaged region Sb is set larger than a movement distance by which the molten glass bead B drops and moves (dimension Lg in FIG. 8B) and smaller than a movement distance by which the water droplet D drops and moves (dimension Lw in FIG. 8B) (Lg<Y<Lw) in a period from start of capturing a piece of image data at any given moment to start of capturing a next piece of image data ($\frac{1}{60}$ to $\frac{1}{30}$ seconds).

As described above, with the optimization of the relation between the frame rate and the range (dimension Y) in the up-down direction of the to-be-imaged region Sb of the camera 11, in the breakage detection process (STEP-103) to be described later, comparing the at least two pieces of image data continuously captured (more specifically, image processed data resulting from performing image processing on image data) makes it possible to easily and reliably select the water droplet D from among the plurality of types of high luminance objects 100 and thus prevent the water droplet D from being erroneously identified as the molten glass bead B.

As a result, as described later, the presence of the molten glass bead B makes it possible to detect breakage of any of the glass fiber filaments f more reliably.

Next, a description will be given in more detail of the image processing process (STEP-102).

The image processing process (STEP-102) is a process of performing image processing on the pieces of image data generated in the imaging process (STEP-101) to extract high luminance objects 100 having luminance equal to or greater than the predetermined value.

The image processing process (STEP-102) is performed by the image processor 12.

In the image processor 12, a luminance extraction program for extracting luminance at each position in the pieces of image data that is raw data and extracting, based on the luminance at each position thus extracted, objects having luminance equal to or greater than the predetermined value (threshold) as high luminance objects 100, and the like are stored.

Note that, as described above, the high luminance objects 100 extracted from the pieces of image data by the image processor 12 include not only the molten glass bead B, but also the glass fiber filaments f in the normal state, the water droplet D that drops from the wall or around any one of the nozzles 3a, the mist M generated by evaporation of the water droplet D due to, for example, radiant heat, and the like.

Specifically, for example, each piece of image processed data obtained from a plurality of (for example, three) pieces of image data continuously captured before and after events where any of the glass fiber filaments f in the process of being formed is broken, and the water droplet D drops or the mist M is generated is as follows.

Figure 9A:
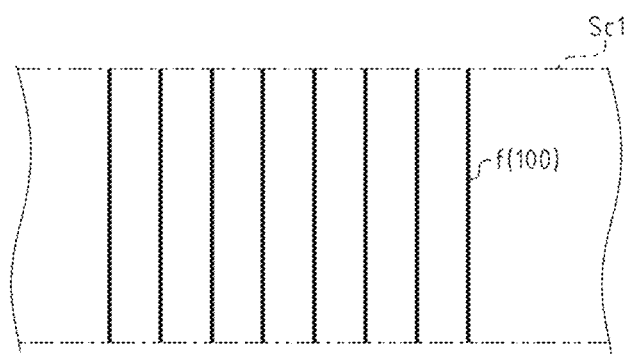
FIG. 9A to FIG. 9C are diagrams showing pieces of image data continuously captured by the image processor according to the different embodiment of the method for manufacturing a glass fiber strand according to the present invention, FIG. 9A being a schematic diagram showing first image data captured at any given moment, the first data representing the normal state where none of the molten glass bead, the water droplet, and the mist have been generated, FIG. 9B being a schematic diagram showing second image data captured after the first image data, the second image data representing a state where the molten glass bead, the water droplet, and the mist have been generated, and FIG. 9C being a schematic diagram showing third image data captured after the second image data, the third image data representing a state where the molten glass bead, the water droplet, and the mist have moved with time.

That is, as shown in FIG. 9A, when none of the plurality of glass filaments f have been broken, and the glass filaments f are in the normal state, only the plurality of glass filaments f are extracted as the high luminance objects 100 from first image processed data Sc1 that results from performing image processing on captured image data (hereinafter, referred to as "first image data").

Figure 9B:
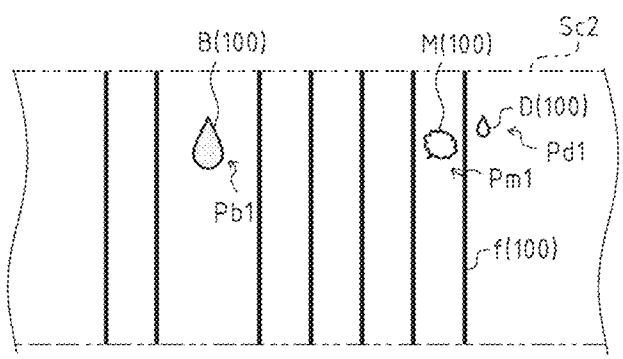

When any of the glass filaments f is broken, the water droplet D drops, and the mist M is generated after the first image data is captured and before the next image data (hereinafter, referred to as "second image data") is captured, as shown in FIG. 9B, the molten glass bead B generated by the breakage of the glass filament f, the water droplet D, and the mist M are extracted as high luminance objects 100 from second image processed data Sc2 that results from performing image processing on the second image data.

At this time, the molten glass bead B is extracted as the high luminance object 100 at a position Pb1 along its dropping path. Further, the water droplet D is extracted as the high luminance object 100 at a position Pd1 along its dropping path. Furthermore, the mist M is extracted as the high luminance object 100 at a position Pm1 where the mist M is floating.

Figure 9C:
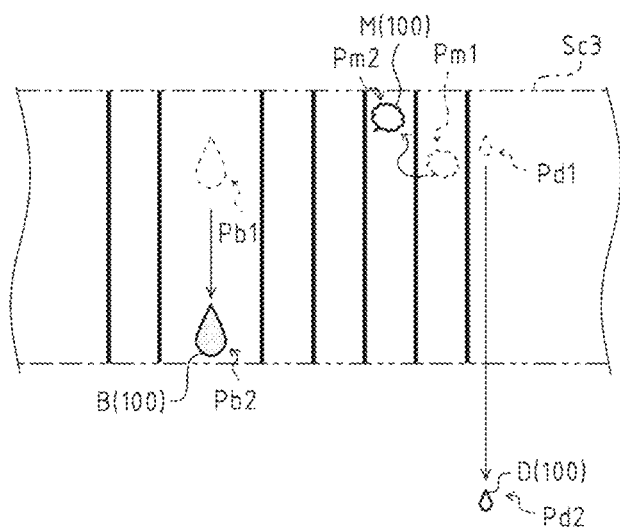

Furthermore, when the next image data (hereinafter referred to as "third image data") is captured after the second image data is captured, as shown in FIG. 9C, the molten glass bead B moves to a position Pb2 vertically below the position Pb1, and the water droplet D moves to a position Pd2 that is vertically below the position Pd1 and out of the to-be-imaged region Sb (see FIG. 8A and FIG. 8B) of the camera 11, and the mist M moves to any position Pm2 while floating due to the influence of air flow or the like, which causes the molten glass bead B and the mist M except for the water droplet D to be extracted as the high luminance objects 100 together with the glass filaments f in the normal state from third image processed data Sc3 that results from performing image processing on the third image data.

Next, a description will be given in more detail of the breakage detection process (STEP-103).

The breakage detection process (STEP-103) is performed by the detector 13.

In the detector 13, a breakage detection program for determining whether the molten glass bead B is present based on the plurality of pieces of image data and detecting breakage of any of the glass fiber filaments f based on the presence of the molten glass bead B, and the like are stored.

The determination of whether the molten glass bead B is present is made by comparing a plurality of (at least three) consecutive pieces of image processed data generated in the image processing process (STEP-102) to compute a difference in luminance between positions, and identifying the movement direction of the high luminance object 100 through comparisons between the computation results.

Herein, the computation of the difference in luminance between positions in the pieces of image processed data is made by, in image processed data based on two pieces of image data continuously captured, subtracting luminance at each position in image processed data based on image data captured first from luminance at a corresponding position in image processed data based on image data captured next.

Specifically, for example, as described above, the first image processed data Sc1, the second image processed data Sc2, and the third image processed data Sc3 obtained respectively based on the first image data, the second image data, and the third image data captured before and after events where the water droplet D drops or the mist M is generated together with breakage of any of the glass fiber filaments f are manipulated as follows.

First, a difference in luminance at each position between the first image processed data Sc1 (see FIG. 9A) and the second image processed data Sc2 (see FIG. 9B) is computed, and then, among the difference computation results, results representing negative values including 0 or less are removed, and the other results are extracted as high luminance objects 100.

Figure 10A:
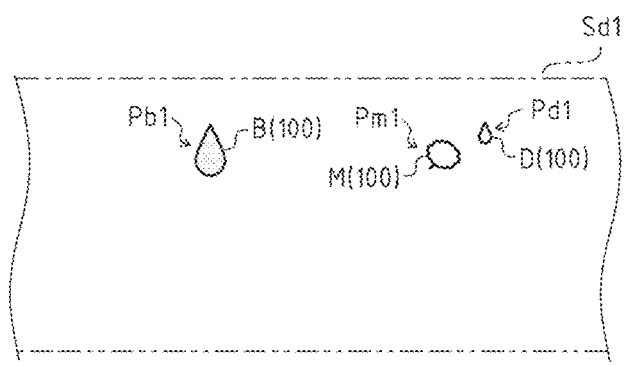
FIG. 10A to FIG. 10C are diagrams for describing the image processing method implemented by the image processor according to the different embodiment of the method for manufacturing a glass fiber strand according to the present invention, FIG. 10A being a schematic diagram showing first image processed data that results from performing difference computation on luminance values between the first image data and the second image data, FIG. 10B being a schematic diagram showing second image processed data that results from performing difference computation on luminance values between the second image data and the third image data, and FIG. 10C being a schematic diagram showing predefined divisions of image processed data that is a result of the difference computation.

Specifically, as shown in FIG. 10A, in first image computed data Sd1 obtained as a result of the computation of a difference between the first image processed data Sc1 and the second image processed data Sc2, the glass filaments f in the normal state have almost no change in luminance with time and are removed because the result of the computation of a difference in luminance is 0.

Further, the molten glass bead B is extracted as the high luminance object 100 because the result of the computation of a difference in luminance at the position Pb1 is greater than 0.

Further, the water droplet D is extracted as the high luminance object 100 because the result of the computation of a difference in luminance at the position Pd1 is greater than 0.

Furthermore, the mist M is extracted as the high luminance object 100 because the result of the computation of a difference in luminance at the position Pm1 is greater than 0.

Next, a difference in luminance at each position between the second image processed data Sc2 (see FIG. 9B) and the third image processed data Sc3 (see FIG. 9C) is computed, and then, among the difference computation results, results representing negative values including 0 or less are removed, and the other results are extracted as high luminance objects 100.

Figure 10B:
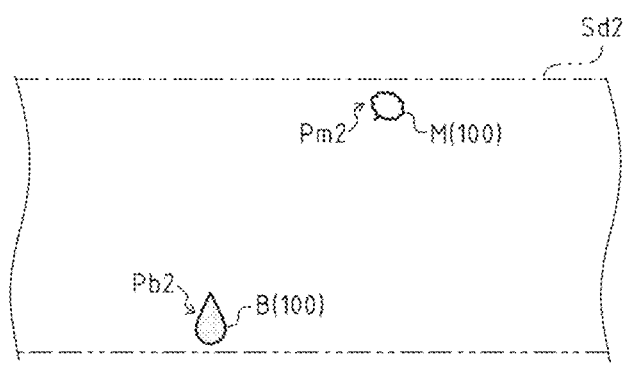

As a result, as shown in FIG. 10B, in second image computed data Sd2 obtained as a result of the computation of a difference between the second image processed data Sc2 and the third image processed data Sc3, the glass filaments f in the normal state have almost no change in luminance with time and are removed because the result of the computation of a difference in luminance is 0.

Further, the molten glass bead B is extracted as the high luminance object 100 because the result of the computation of a difference in luminance at the position Pb1 is a negative value and thus removed, and the result of the computation of a difference in luminance at the position Pb2 is greater than 0.

Further, the water droplet D is not extracted as the high luminance object 100 because the result of the computation of a difference in luminance at the position Pd1 is a negative value and thus removed, and the position Pd2 is out of the to-be-imaged region Sb of the camera 11 (see FIG. 8A and FIG. 8B).

Furthermore, the mist M is extracted as the high luminance object 100 because the result of the computation of a difference in luminance at the position Pm1 is a negative value and thus removed, and the result of the computation of a difference in luminance at the position Pm2 is greater than 0.

Through the comparison operation on the first image computed data Sd1 and the second image computed data Sd2 thus obtained, the movement direction of the high luminance object 100 is identified, and a determination is made of whether the molten glass bead B is present.

Figure 10C:
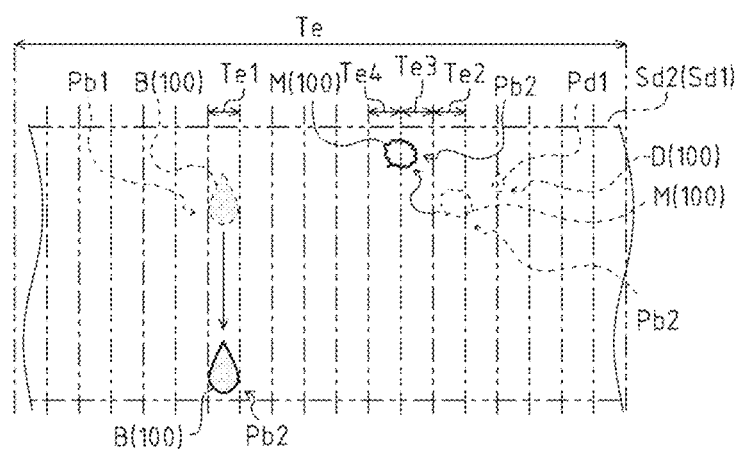

That is, as shown in FIG. 10C, the pieces of image computed data Sd1, Sd2 obtained through the above-described difference computation are each divided in advance into a plurality of regions Te arranged in a lateral direction (an orthogonal direction to the up-down direction), and the movement direction of the high luminance object 100 whose position Pb1 in the first image computed data Sd1 and position Pb2 in the second image computed data Sd2 are both within a division Te1 is identified as the vertical direction and thus determined as the molten glass bead B.

Further, the movement direction of the high luminance object 100 whose position Pm1 is within a division Te2 in the first image computed data Sd1 and position Pm2 is across divisions Te3, Te4 different from the division Te2 in the second image computed data Sd2 is identified as any direction (not the vertical direction) and thus determined as the mist M.

This makes it possible to easily and reliably select at least the mist M that moves in an irregular direction with time from among the plurality of types of high luminance objects 100, prevent the mist M from being erroneously identified as the glass beads B as much as possible, and thus detect breakage of any of the glass fiber filaments f more reliably.

Note that since the high luminance object 100 extracted at the position Pd1 from the first image computed data Sd1 is not extracted from the second image computed data Sd2, the high luminance object 100 is immediately determined as the water droplet D that cannot successively appear in at least two pieces of image data continuously captured (more specifically, image processed data).

Thus, in accordance with the method for detecting breakage of any of the glass fiber filaments f according to the different embodiment, only the molten glass bead B is more reliably identified from among the various types of high luminance objects 100 including the glass fiber filaments f in the normal state, the water droplet D, and the mist M by recognizing a difference in movement direction or movement velocity, and the presence of the molten glass bead B makes it possible to detect breakage of any of the glass fiber filaments f more reliably.

Note that the comparison operation for identifying the movement direction of the high luminance object 100 described above is performed on two pieces of image computed data (the first image computed data Sd1 and the second image computed data Sd2), but the present invention is not limited to such a configuration, and the comparison operation may be performed on three or more pieces of image computed data.

That is, since the mist M is floating and moves in an irregular direction with time, when the mist M accidentally moves vertically upward, the movement direction of the mist M is identified as the vertical direction based on the two pieces of image computed data, and the mist M may be erroneously identified as the molten glass bead B.

Therefore, the comparison operation for identifying the movement direction of the high luminance object 100 on the three or more pieces of image computed data makes it possible to reduce the possibility of erroneously identifying such a mist M as the molten glass bead B and thus more reliably identify only the molten glass bead B from among the plurality of types of high luminance objects 100.

More specifically, when an object moves vertically upward accidentally within the same division Te in the first two pieces of image computed data and is positioned out of the division Te in the third and subsequent pieces of image computed data, the object is determined as the mist M.

Further, even when the object accidentally keeps moving vertically upward in the three or more pieces of image computed data, the object is determined as the mist M because the object is lower in drop velocity than the molten glass bead B.

Method for Detecting Breakage of Glass Fiber Filament f According to Another Different Embodiment In accordance with the method for detecting breakage of any of the glass fiber filaments f according to the different embodiment described above, mainly, a difference in movement directions of the plurality of types of high luminance objects 100 is recognized by computing a difference in luminance at each position among the plurality of consecutive pieces of image processed data, but the present invention is not limited to such a procedure, and, for example, a difference in movement directions of the plurality of types of high luminance objects 100 may be recognized based on a shape of a path that changes with time of each of the high luminance objects 100.

That is, in accordance with a method for detecting breakage of any of the glass fiber filaments f according to another different embodiment, with a shutter speed of the camera 11 set extremely low as compared with the method for detecting breakage of any of the glass fiber filaments f according to the different embodiment described above, in the imaging process (STEP-101), the shape of the path of the high luminance object 100 may be captured as image data.

In this configuration, in order to make a difference in shape of a path between the molten glass bead B and the water droplet D clearer, it is desirable that the shutter speed of the camera 11 be set to achieve an exposure time that allows the path of the dropping molten glass bead B to stay within the to-be-imaged region Sb (see FIG. 8A and FIG. 8B) and causes the shape of the path of the water droplet D to extend outside the to-be-imaged region Sb.

That is, it is desirable that the exposure time of the camera 11 be set so that the movement distance of the molten glass bead B (dimension Lg in FIG. 8B) is short, and the movement distance of the water droplet D (dimension Lw in FIG. 8B) is long as compared with the range in the up-down direction of the to-be-imaged region Sb (dimension Y in FIG. 8B) in a period from start to finish of capturing of each piece of image data.

Figure 11:
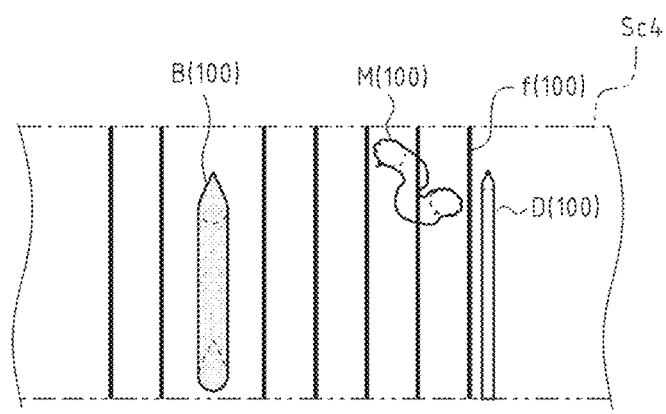
FIG. 11 is a schematic diagram for describing an image processing method implemented by an image processor according to another different embodiment of the method for manufacturing a glass fiber strand according to the present invention, showing image data captured with an exposure time of the camera set longer in a state where the molten glass bead, the water droplet, and the mist have been generated.

Then, for example, as shown in FIG. 11, in the image processing process (STEP-102), fourth image processed data Sc4 that results from performing image processing on captured image data is obtained, and high luminance objects 100 having various shapes of paths are extracted, and, in the breakage detection process (STEP-103), based on the shapes of paths of the high luminance objects 100 thus extracted, a difference in movement directions of the high luminance objects 100 is recognized, and then the molten glass bead B is identified.

Specifically, a high luminance object 100 having a shape of a path linearly extending from the upper end to the lower end of the fourth image processed data Sc4 is determined as the glass fiber filament f in the normal state, and thus removed from the plurality of types of high luminance objects 100 thus extracted.

Further, a high luminance object 100 having a shape of a path linearly extending from one end (the lower end in the present embodiment) to a middle of the fourth image processed data Sc4 is determined as the water droplet D, and thus removed from the plurality of types of high luminance objects 100 extracted.

Furthermore, a high luminance object 100 having a shape of a path other than a straight line is determined as the mist M, and thus removed from the plurality of types of high luminance objects 100 extracted.

Then, only a high luminance object 100 having a shape of a path that linearly extends and whose both ends appear within the fourth image processed data Sc4 is identified as the molten glass bead B from among the plurality of types of high luminance objects 100 extracted.

Since the difference in movement directions of the high luminance objects 100 is recognized based on the shapes of paths of the high luminance objects 100, and then the molten glass bead B is identified from among the plurality of types of high luminance objects 100, an amount of image data obtained in the imaging process (STEP-101) can be reduced, and thus the molten glass bead B can be more easily identified as compared with the method for detecting breakage of any of the glass fiber filaments f according to the difference embodiment described above.

Note that, for the imaging process (STEP-101), another configuration may be employed in which a plurality of types of image data are simultaneously captured in advance with different exposure times using the camera 11 having a plurality of applicable shutter speeds, and, in accordance with a change in surrounding environment or a change in manufacturing condition of the glass fiber filaments f, image data from which a high luminance object 100 having a desired shape is extracted can be selected later.

REFERENCE SIGNS LIST

3a Nozzle
100 High luminance object
D Water droplet
f Glass fiber filament
G Molten glass
Lg Movement distance of molten glass bead B
Lw Movement distance of water droplet
S Glass fiber strand
Sb To-be-imaged region
Sc1 First image processed data (image data)
Sc2 Second image processed data (image data)
Sc3 Third image processed data (image data)
Sc4 Fourth image processed data (image data)
Sd1 First image computed data (image data)
Sd2 Second image computed data (image data)
STEP-1 Imaging process
STEP-101 Imaging process
STEP-2 Image processing process
STEP-102 Image processing process
STEP-3 Breakage detection process
STEP-103 Breakage detection process
V Drop velocity
X Range in up-down direction of to-be-imaged region

The invention claimed is:

1. A method for manufacturing a glass fiber strand by which a plurality of glass fiber filaments formed of molten glass being drawn out from a plurality of nozzles are bound together into a glass fiber strand, the method comprising:
an imaging process of continuously imaging the plurality of glass fiber filaments to generate a plurality of pieces of image data;
an image processing process of extracting a high brightness object having brightness equal to or greater than a predetermined value from the plurality of pieces of image data; and
a breakage detection process of detecting breakage of any of the glass fiber filaments based on a result of image processing performed in the image processing process, wherein
in the breakage detection process,
whether a position of the high brightness object has changed is detected based on the plurality of pieces of image data, and, when a result of the detection indicates that the position of the high brightness object has changed, a determination is made that any of the glass fiber filaments has been broken,
wherein
in the breakage detection process,
a drop velocity of the high brightness object is computed based on the plurality of pieces of image data, and
when the drop velocity based on the computation is equal to or greater than 1 cm/s, a determination is made that any of the glass fiber filaments has been broken.

2. The method for manufacturing a glass fiber strand according to claim 1, wherein
in the breakage detection process,
when the drop velocity based on the computation is equal to or less than 5 m/s, a determination is made that any of the glass fiber filaments has been broken.

3. The method for manufacturing a glass fiber strand according to claim 2, wherein
in the imaging process,
a region below a tip of each of the nozzles and below a molten glass cone at the tip is imaged to generate the plurality of pieces of image data.

4. The method for manufacturing a glass fiber strand according to claim 1, wherein
in the imaging process,
a range in an up-down direction of a to-be-imaged region of each of the plurality of pieces of image data is set larger than a movement distance by which a molten glass bead moves and smaller than a movement distance by which a water droplet moves in a period from start of capturing a piece of image data at any given moment to start of capturing a next piece of image data.

5. The method for manufacturing a glass fiber strand according to claim 1 or 4, wherein
in the breakage detection process,
a movement direction of the high brightness object is identified based on the plurality of pieces of image data, and
when the movement direction is identified as a vertical direction, a determination is made that any of the glass fiber filaments has been broken.

6. The method for manufacturing a glass fiber strand according to claim 5, wherein
in the imaging process,
a region below a tip of each of the nozzles and below a molten glass cone at the tip is imaged to generate the plurality of pieces of image data.

7. The method for manufacturing a glass fiber strand according to any one of claim 1 or 4, wherein
in the imaging process,
a region below a tip of each of the nozzles and below a molten glass cone at the tip is imaged to generate the plurality of pieces of image data.

8. The method for manufacturing a glass fiber strand according to claim 1, wherein
in the imaging process,
the plurality of pieces of image data are generated through imaging of the plurality of glass fiber filaments with a predetermined exposure time,
the predetermined exposure time is set to a time that causes a movement distance of a molten glass bead to be shorter and causes a movement distance of a water droplet to be longer in a range in a period from start to finish of capturing of each of the pieces of image data, as compared with a range in an up-down direction of a to-be-imaged region of each of the plurality of pieces of image data, and
in the breakage detection process,
a shape of a path of the high brightness object is identified based on the plurality of pieces of image data, and when the shape of the path identified linearly extends and has both ends located within the to-be-imaged region, a determination is made that any of the glass fiber filaments has been broken.

9. The method for manufacturing a glass fiber strand according to claim 8, wherein
in the imaging process,
a region below a tip of each of the nozzles and below a molten glass cone at the tip is imaged to generate the plurality of pieces of image data.

* * * * *